US011111260B2

(12) United States Patent
Klinkenberg et al.

(10) Patent No.: US 11,111,260 B2
(45) Date of Patent: Sep. 7, 2021

(54) METHODS FOR FORMING 1,3,5,7-TETRAALKYL-6-(2,4-DIMETHOXYPHENYL)-2,4,8-TRIOXA-6-PHOSPHAADAMANTANE

(71) Applicant: Dow Global Technologies LLC, Midland, MI (US)

(72) Inventors: Jessica L. Klinkenberg, Midland, MI (US); John R. Briggs, Charleston, WV (US); Andrew M. Camelio, Midland, MI (US); Robert David Grigg, Midland, MI (US); Siyu Tu, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/490,989

(22) PCT Filed: Mar. 22, 2018

(86) PCT No.: PCT/US2018/023678
§ 371 (c)(1),
(2) Date: Sep. 4, 2019

(87) PCT Pub. No.: WO2018/175671
PCT Pub. Date: Sep. 27, 2018

(65) Prior Publication Data
US 2020/0010494 A1 Jan. 9, 2020

Related U.S. Application Data

(60) Provisional application No. 62/475,409, filed on Mar. 23, 2017.

(51) Int. Cl.
C07F 9/6571 (2006.01)
(52) U.S. Cl.
CPC .............. C07F 9/657163 (2013.01)
(58) Field of Classification Search
USPC .......................................... 568/12
See application file for complete search history.

(56) References Cited

U.S. PATENT DOCUMENTS

| 3,026,327 A | 3/1962 | Epstein et al. |
| 3,050,531 A | 8/1962 | Epstein et al. |
| 3,974,217 A | 8/1976 | Miles |
| 5,698,736 A | 12/1997 | Telschow et al. |

FOREIGN PATENT DOCUMENTS

WO 2016164258 A1 10/2016

OTHER PUBLICATIONS

Toyota et al. Heteroatom Chemistry vol. 12, No. 5, Year 2001, p. 418-423.*
Giani et al. Computers and Chemical Engineering 29 (Year 2005) 1661-1676.*
Examination Report pertaining to corresponding European Patent Application No. 18717765.4, dated Sep. 23, 2020.
Adjabeng et al, "Novel Class of Tertiary Phosphine Ligands Based on a Phosha-adamantane Framework and Use in the Suzuki Cross-Coupling Reactions of Aryl Halides under Mild Conditions", Org. Lett. 2003, 5, 953-955.
Baber et al, "Phenylphosphatriox-adamantanes: bulky, robust, electron-poor ligands that give very efficient rhodium(I) hydroformylation catalysts", Dalton Trans. 2005, 1079-1085.
Baccolini et al., "A New Performance of the Reaction of PCI3/AICI3 with Anisoles—One-Pot and Multi-Step Syntheses of a New Fused-Ring System [1,2,3]Benzoxadiphospholo[2,3-b][1,2,3]benzoxadiphosphle", Eur. J. Org. Chem. 2001, 2229.
Brenstrum et al, "Phosphaadamantanes as Ligands for Palladium Catalyzed Cross-Coupling Chemistry: Library Synthesis, Characterization, and Screening in the Suzuki Coupling of Alkyl Halides and Tosylates Containing b-Hydrogens with Boronic Acids and Alkylboranes", J. Org. Chem. 2004, 69, 7635.
Downing et al, "General Routes to Alkyl Phosphatrioxaadamantane Ligands", Organometallics, 2008, 27, 3216-3224.
Epstein et al., "A Novel Phosphorus Heterocyclic System from the Reactions of Phosphine and Primary Phosphines with 2,4-Pentanedione", J. Am. Chem. Soc. 1961, 83, 3279-3282.
International Search Report and Written Opinion pertaining to PCT/US2018/023678, dated May 29, 2018.
Protopopov et al., "Reactions of Phenol Ethers with Phosphorus Trichloride", S. Ordzhonikidze All-Union Chemical and Pharmaceutical Research Institute, 1964, 35, 1446-1449.
Simeon et al., "A Direct and New Convenient Oxidation: Synthesis of Substituted Arylphosphonates from Aromatics", Tetrahedron, 1998, 54, 10111.

* cited by examiner

Primary Examiner — Ana Z Muresan
(74) Attorney, Agent, or Firm — Dinsmore & Shohl LLP

(57) ABSTRACT

A method for forming 1,3,5,7-tetraalkyl-6-(2,4-dimethoxyphenyl)-2,4,8-trioxa-6-phosphaadamantane includes obtaining a solution comprising an ethereal solvent and an aluminum hydride, adding dichloro(2,4-dimethoxyphenyl)phosphine to the solution to produce 2,4-dimethoxyphenylphosphine, and reacting the 2,4-dimethoxyphenylphosphine with an acidic mixture comprising diones to produce 1,3,5,7-tetraalkyl-6-(2,4-dimethoxyphenyl)-2,4,8-trioxa-6-phosphaadamantane. The solution has a temperature from IN greater than −20 C. to 50 C. throughout the method. Another method for forming 1,3,5,7-tetraalkyl-6-(2,4-dimethoxyphenyl)-2,4,8-tri-oxa-6-phosphaadamantane includes obtaining dichloro(2,4-dimethoxyphenyl)phosphine, forming 2,4-dimethoxyphenylphosphine by adding the dichloro(2,4-dimethoxyphenyl)phosphine to a solution comprising at least one solvent and an aluminum hydride, reacting the 2,4-dimethoxyphenylphosphine with a mixture to produce 1,3,5,7-tetraalkyl-6-(2,4-dimethoxyphenyl)-2,4,8-trioxa-6-phosphaadamantane. The mixture includes an acid selected from the group consisting of Lewis acids, sulfonic Bronsted acids, and mixtures thereof, an aromatic or non-aromatic hydrocarbons; and acetylacetone.

18 Claims, No Drawings

METHODS FOR FORMING 1,3,5,7-TETRAALKYL-6-(2,4-DIMETHOXYPHENYL)-2,4,8-TRIOXA-6-PHOSPHAADAMANTANE

CROSS-REFERENCE TO RELATED APPLICATION

This application claims priority to U.S. Provisional Patent Application No. 62/475,409, filed Mar. 23, 2017, entitled "Methods For Forming 1,3,5,7-Tetraalkyl-6-(2,4-Dimethoxyphenyl)-2,4,8-Trioxa-6-Phosphaadamantane", the contents of which are hereby incorporated by reference in their entirety.

BACKGROUND

Field

The present specification generally relates to processes for synthesizing 1,3,5,7-tetraalkyl-6-(2,4-dimethoxyphenyl)-2,4,8-trioxa-6-phosphaadamantanes, and particularly is directed to three-step processes for synthesizing 1,3,5,7-tetramethyl-6-(2,4-dimethoxyphenyl)-2,4,8-trioxa-6-phosphaadamantane.

Technical Background 1,3,5,7-tetraalkyl-6-(2,4-dimethoxyphenyl)-2,4,8-trioxa-6-phosphaadamantane has potential uses as a commercial ligand in transition metal catalysis. For instance, 1,3,5,7-tetraalkyl-6-(2,4-dimethoxyphenyl)-2,4,8-trioxa-6-phosphaadamantane can be used as an aid in Heck, Suzuki, and Sonogashira cross-coupling reactions. In particular, 1,3,5,7-tetraalkyl-6-(2,4-dimethoxyphenyl)-2,4,8-trioxa-6-phosphaadamantane may be used to prepare various catalysts for such carbon-carbon bond forming reactions, such as, for example, a butadiene telomerization catalyst.

Unfortunately, traditional methods for preparing 1,3,5,7-tetraalkyl-6-(2,4-dimethoxyphenyl)-2,4,8-trioxa-6-phosphaadamantane comprise costly, flammable, and toxic materials. Accordingly, a need exists for methods of forming 1,3,5,7-tetraalkyl-6-(2,4-dimethoxyphenyl)-2,4,8-trioxa-6-phosphaadamantane that do not include these costly, flammable, and toxic materials.

SUMMARY

According to one embodiment, a method for forming 1,3,5,7-tetraalkyl-6-(2,4-dimethoxyphenyl)-2,4,8-trioxa-6-phosphaadamantane, comprises: obtaining a solution comprising an ethereal solvent and an aluminum hydride; adding dichloro(2,4-dimethoxyphenyl)phosphine to the solution to produce 2,4-dimethoxyphenylphosphine; reacting the 2,4-dimethoxyphenylphosphine with an acidic mixture comprising diones, including, but not limited to 2,4-pentanedione (acetylacetone) to produce 1,3,5,7-tetraalkyl-6-(2,4-dimethoxyphenyl)-2,4,8-trioxa-6-phosphaadamantane. The solution has a temperature from greater than −20° C. to 50° C. throughout the method.

In another embodiment, a method for forming 1,3,5,7-tetraalkyl-6-(2,4-dimethoxyphenyl)-2,4,8-trioxa-6-phosphaadamantane, comprises: obtaining dichloro(2,4-dimethoxyphenyl)phosphine; forming 2,4-dimethoxyphenylphosphine by adding the dichloro(2,4-dimethoxyphenyl)phosphine to a solution comprising at least one solvent and an aluminum hydride; reacting the 2,4-dimethoxyphenylphosphine with a mixture to produce 1,3,5,7-tetraalkyl-6-(2,4-dimethoxyphenyl)-2,4,8-trioxa-6-phosphaadamantane. The mixture comprises: an acid selected from the group consisting of Lewis acids, Bronsted acids, and mixtures thereof; an aromatic or non-aromatic hydrocarbon solvent; and acetylacetone.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification.

DETAILED DESCRIPTION

Common abbreviations are listed below:

AcOH: acetic acid; PPTS: pyridinium p-toluene sulfonate; PTSA: p-toluene sulfonic acid; $F_3CCO_2H$: trifluoroacetic acid; $BF_3OEt_2$: boron trifluoride diethyl etherate; $TiCl_4$: titanium tetrachloride; $InBr_3$: Iridium (III) bromide; EtOH: ethanol; $PH_3$: phosphine; HCl: hydrochloric acid; $Pd(PPh_3)_4$: tetrakis(triphenylphosphine)palladium(0); $K_2CO_3$: potassium carbonate; $ZnCl_2$: zinc chloride; $PCl_3$: phosphorous chloride; $MeCOCH_2COMe$: acetylacetone; $MeSO_3H$: methanesulfonic acid; $H_2SO_4$: sulfuric acid; THF: tetrahydrofuran; $Et_2O$: diethyl ether; $LiAlH_4$: lithium aluminum hydride; PhMe: toluene; NaOH: sodium hydroxide; $NaSO_4$: sodium sulfate; $BF_3$: boron trifluoride; $BCl_3$: boron trichlroride; M: molar; min: minutes; equiv or eq.: equivalence; mmol: millimolar; and mL: milliliter.

One conventional way to produce 1,3,5,7-tetraalkyl-6-(2,4-dimethoxyphenyl)-2,4,8-trioxa-6-phosphaadamantane is shown in the following reaction scheme:

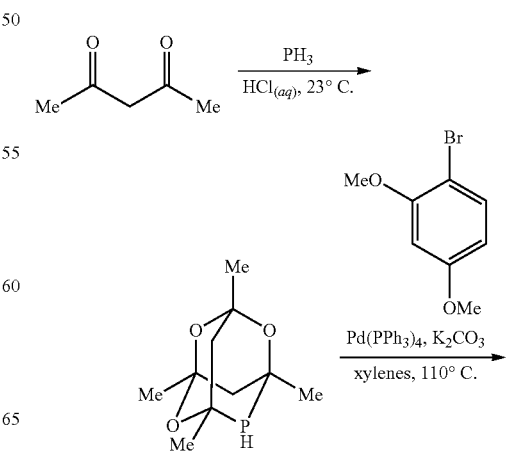

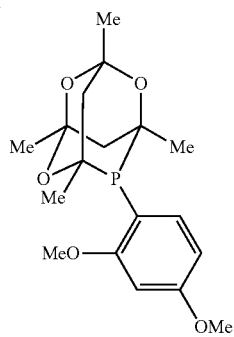

As shown above, this synthesis is a two-step process. In the first step acetylacetone is reacted with aqueous hydrochloric acid and phosphine gas at ambient temperature to form 1,3,5,7-tetramethyl-2,4,8-trioxa-6-phosphaadamantane. In the second step the 1,3,5,7-tetramethyl-2,4,8-trioxa-6-phosphaadamantane is reacted with tetrakis(triphenylphosphine)palladium(0), potassium carbonate, and 2,4-methoxyphenyl bromide, in xylenes at 110° C. to yield 1,3,5,7-tetraalkyl-6-(2,4-dimethoxyphenyl)-2,4,8-trioxa-6-phosphaadamantane. Although this reaction comprises only two steps—the first of which is conducted at ambient temperature—the use of phosphine gas in the first step is problematic. Namely, phosphine gas is costly, flammable, and toxic. Accordingly, this synthetic pathway is not preferred. Other processes to form 1,3,5,7-tetraalkyl-6-(2,4-dimethoxyphenyl)-2,4,8-trioxa-6-phosphaadamantane likewise include components that are not desirable for safety or economic reasons. However, methods for forming 1,3,5,7-tetraalkyl-6-(2,4-dimethoxyphenyl)-2,4,8-trioxa-6-phosphaadamantane according to embodiments disclosed and described herein use reactions that do not include such problematic chemical components.

Methods for forming 1,3,5,7-tetraalkyl-6-(2,4-dimethoxyphenyl)-2,4,8-trioxa-6-phosphaadamantane of embodiments disclosed and described herein comprise three steps. Although the method to form 1,3,5,7-tetraalkyl-6-(2,4-dimethoxyphenyl)-2,4,8-trioxa-6-phosphaadamantane described in embodiments disclosed herein comprise three steps, which is one more than the two-step method described above, the three-step methods according to embodiments do not use phosphine gas or other similarly toxic and flammable chemicals. Therefore, although an additional step is involved in the methods described in one or more embodiments, the disclosed three-step method is preferable in many instances. It should be understood that the methods disclosed and described herein are not limited to the above three steps, and other steps may be added, or one or more of the above three steps may be repeated as needed or desired.

The three-step method embodiments generally comprise the following three steps: (1) dichloro(2,4-dimethoxyphenyl)phosphine is obtained; (2) the dichloro(2,4-dimethoxyphenyl)phosphine is converted into 2,4-dimethoxyphenylphosphine; and (3) the 2,4-dimethoxyphenylphosphine is converted into 1,3,5,7-tetraalkyl-6-(2,4-dimethoxyphenyl)-2,4,8-trioxa-6-phosphaadamantane. Each of the three steps will be described in detail below. It should be understood that the numbering of the steps used above and below is done for convenience and does not limit the methods disclosed herein to only three steps or any limiting sequence of steps.

As mentioned above, the first step comprises obtaining dichloro(2,4-dimethoxyphenyl)phosphine. Methods to form dichloro(2,4-dimethoxyphenyl)phosphine are known, and, in various embodiments, any suitable method may be used to obtain the dichloro(2,4-dimethoxyphenyl)phosphine. However, in one or more embodiments, the dichloro(2,4-dimethoxyphenyl)phosphine is formed by converting 1,3-dimethoxybenzene into the (2,4-dimethoxyphenyl)dichlorophosphine. The 1,3-dimethoxybenzene may, in some embodiments, be reacted with phosphorus trichloride and another metal chloride to form the (2,4-dimethoxyphenyl)dichlorophosphine. Such metal chlorides may include, for example, aluminum chloride, tin (II) or (IV) chloride, titanium(IV) chloride, zinc dichloride, complexes of chromium chloride, manganese dichloride, complexes of molybdenum chloride, bismuth(III) chloride, iron(II) or (III) chloride, cobalt(II) or (III) chloride, and nickel(I), (II) or (IV) chloride. In some embodiments, the metal chloride is present in amount from 0.01 equivalents (eq) to 0.5 eq, such as from 0.05 eq to 0.07 eq, or about 0.06 eq with respect to 1,3-dimethoxybenzene. In one or more embodiments, the phosphorus trichloride is present in an amount from 2.00 eq to 8.00 eq, such as from 3.00 eq to 7.00 eq, from 4.00 eq to 6.00 eq, or about 5.00 eq. In some embodiments, the 1,3-dimethoxybenzene is present in amounts from 0.70 eq to 1.30 eq, such as from 0.80 eq to 1.20 eq, from 0.90 eq to 1.10 eq, or about 1.00 eq. The temperature at which this reaction occurs may be, in one or more embodiments, from 60° C. to 120° C., such as from 85° C. to 115° C., from 90° C. to 110° C., from 95° C. to 105° C., or about 100° C. The duration of the reaction is from 10 hours to 20 hours, such as from 11 hours to 19 hours, from 12 hours to 18 hours, from 13 hours to 17 hours, from 14 hours to 16 hours, or about 15 hours.

One exemplary reaction, according to some embodiments, for obtaining dichloro(2,4-dimethoxyphenyl)phosphine from 1,3-dimethoxybenzene is as follows:

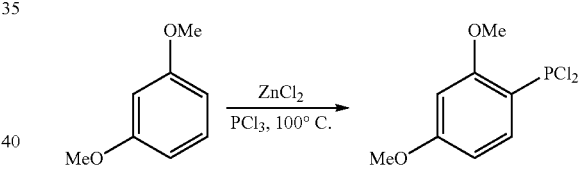

In this exemplary equation 1,3-dimethoxybenzene is reacted with zinc dichloride and phosphorus trichloride at 100° C. to produce the dichloro(2,4-dimethoxyphenyl)phosphine. The 1,3-dimethoxybenzene used in the above reaction may be obtained in any suitable manner and/or by any suitable method. It should be understood that the above reaction pathway is one possible method for obtaining dichloro(2,4-dimethoxyphenyl)phosphine and is exemplary only.

The second step of the method for forming 1,3,5,7-tetraalkyl-6-(2,4-dimethoxyphenyl)-2,4,8-trioxa-6-phosphaadamantane according to embodiments comprises converting the dichloro(2,4-dimethoxyphenyl)phosphine to 2,4-dimethoxyphenylphosphine. This step comprises two sub-steps that, in embodiments, are conducted in a specific order to reduce the likelihood of making and/or proliferating undesired products or byproducts. The first sub-step is obtaining a solution comprising an ethereal solvent (i.e., a solvent comprising one or more ether component) and an aluminum hydride. The second sub-step is adding the dichloro(2,4-dimethoxyphenyl)phosphine to the solution comprising the ethereal solvent and the aluminum hydride. If these sub-steps are performed in reverse order—i.e., adding the ethereal solvent and the aluminum hydride to the dichloro(2,4-dimethoxyphenyl)phosphine—an undesirable pentaphosphine product or byproduct is formed. In addition to the ethereal solvent and the aluminum hydride, in various embodiments, a non-polar hydrocarbon solvent may also be used. The non-polar hydrocarbon solvent may be added in some embodiments to the solution of ethereal solvent and aluminum hydride, but in other embodiments the non-polar hydrocarbon solvent may be added to the dichloro(2,4-dimethoxyphenyl)phosphine to create a solution. In yet other embodiments, the non-polar hydrocarbon solvent may be added to both the solution of ethereal solvent and aluminum hydride and the dichloro(2,4-dimethoxyphenyl) phosphine. The aluminum hydride used in step two is a liquid or delivered as a solution, thus, in embodiments will readily mix with the non-polar hydrocarbon solvent, when the components are mixed together. Correspondingly, the reactivity of the aluminum hydride can be carefully controlled by blending in non-polar solvent.

The aluminum hydride, in one or more embodiments, is an alkali aluminum hydride or an organoaluminum hydride. For instance, in some embodiments, the aluminum hydride can be selected from the group consisting of lithium aluminum hydride, sodium aluminum hydride, potassium aluminum hydride, rubidium aluminum hydride, cesium aluminum hydride, di-isobutyl aluminum hydride (DIBAL-H), sodium vitride (Red-Al), alane, lithium tri-tertbutoxy aluminum hydride, and mixtures thereof. In one or more embodiments, the aluminum hydride is lithium aluminum hydride.

In various embodiments, the ethereal solvent may be selected from the group consisting of cyclopentyl methyl ether, di-tert-butyl ether, diethyl ether, diethylene glycol diethyl ether, diglyme, diisopropyl ether, diphenyl ether, dimethoxyethane, 1,4-dioxane, ethyl tert-butyl ether, methoxyethane, 2-(2-methoxyethoxy)ethanol, methyl tert-butyl ether, 2-methyltetrahydrofuran, N-methylmorpholine, tetrahydrofuran (THF), tetrahydropyran, and mixtures thereof. In one or more embodiments, the ethereal solvent is tetrahydrofuran.

In some embodiments, the non-polar hydrocarbon solvent is selected from the group consisting of benzene, pentane, octane, cyclooctane, methylcyclohexane, hexane, cyclohexane, toluene, heptane, and mixtures thereof. In one or more embodiments, the non-polar hydrocarbon solvent is toluene.

The amount of aluminum hydride used in the second step of methods for forming 1,3,5,7-tetraalkyl-6-(2,4-dimethoxyphenyl)-2,4,8-trioxa-6-phosphaadamantane described herein is, in some embodiments, from 0.40 eq to 0.80 eq, such as from 0.50 eq to 0.70 eq, or about 0.50 eq, with respect to dichloro(2,4-dimethoxyphenyl)phosphine. The amount of dichloro(2,4-dimethoxyphenyl)phosphine used in the second step is from 0.70 eq to 1.30 eq, such as from 0.80 eq to 1.20 eq, from 0.90 eq to 1.10 eq, or about 1.00 eq.

In various embodiments, the conversion of dichloro(2,4-dimethoxyphenyl)phosphine to 2,4-dimethoxyphenylphosphine is conducted at temperatures from greater than −20° C. to 50° C. throughout the method, such as from −15° C. to 45° C. throughout the method, from −10° C. to 40° C. throughout the method, from −5° C. to 35° C. throughout the method, from 0° C. to 30° C. throughout the method, from 5° C. to 25° C. throughout the method, or from 10° C. to 20° C. throughout the method. In other embodiments, the conversion of dichloro(2,4-dimethoxyphenyl)phosphine to 2,4-dimethoxyphenylphosphine is conducted at temperatures from greater than 0° C. to 25° C. throughout the method, such as from 5° C. to 20° C. throughout the method, or from 10° C. to 15° C. throughout the method. Traditionally, the conversion of dichloro(2,4-dimethoxyphenyl)phosphine to 2,4-dimethoxyphenylphosphine is conducted at extremely low temperatures, such as below −20° C. or even below −50° C. However, using the methods of embodiments allows the conversion to take place at higher temperatures, which reduces the processing costs. However, if the reaction temperature gets too high, the conversion of dichloro(2,4-dimethoxyphenyl)phosphine to 2,4-dimethoxyphenylphosphine will take place unselectively due to the formation of undesired byproducts. Accordingly, the temperature for converting dichloro(2,4-dimethoxyphenyl)phosphine to 2,4-dimethoxyphenylphosphine should, in embodiments, be maintained within the ranges described herein.

The duration of the conversion of dichloro(2,4-dimethoxyphenyl)phosphine to 2,4-dimethoxyphenylphosphine is, in some embodiments, less than 15 hours, such as less than 14 hours, less than 13 hours, less than 12 hours, less than 11 hours, or even less than 10 hours. In other embodiments, the duration of the conversion of dichloro(2,4-dimethoxyphenyl)phosphine to 2,4-dimethoxyphenylphosphine is less than about 10 minutes.

The rate at which the dichloro(2,4-dimethoxyphenyl)phosphine can be added to the solutions containing aluminum hydride is limited by the maximum temperature at which the desired reaction will take place. Adding dichloro(2,4-dimethoxyphenyl)phosphine to a solution comprising aluminum hydride is an exothermic reaction. Thus, quick addition of dichloro(2,4-dimethoxyphenyl)phosphine to the solution comprising aluminum hydride causes the temperature within the reaction vessel to increase at a rapid rate. In embodiments, the configuration and set-up of the reaction vessel is not particularly limited, but the reaction vessel should, in one or more embodiment, be configured to release pressure within the vessel. If the temperature in the reaction vessel exceeds the maximum temperature at which the desired reaction will occur (i.e., about 50° C.), then the dichloro(2,4-dimethoxyphenyl)phosphine will not efficiently convert to 2,4-dimethoxyphenylphosphine. Accordingly, dichloro(2,4-dimethoxyphenyl)phosphine is added to the solution comprising aluminum hydride at a rate that allows the temperature within the reaction vessel to be maintained below the maximum temperature at which dichloro(2,4-dimethoxyphenyl)phosphine converts to 2,4-dimethoxyphenylphosphine. Therefore, the rate at which dichloro(2,4-dimethoxyphenyl)phosphine is added to the solution comprising aluminum hydride is determined by the cooling efficiency of the reaction vessel and the tradeoff between slowly adding dichloro(2,4-dimethoxyphenyl)phosphine to the solution comprising aluminum hydride and cooling the reaction vessel.

One exemplary reaction, according to some embodiments, for converting dichloro(2,4-dimethoxyphenyl)phosphine to 2,4-dimethoxyphenylphosphine is as follows:

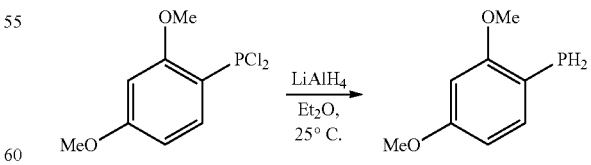

In this exemplary reaction equation, a solution of lithium aluminum hydride in a diethyl ether solvent is formed. The dichloro(2,4-dimethoxyphenyl)phosphine is added to the solution of lithium aluminum hydride in diethyl ether where the solution of lithium aluminum hydride in diethyl ether is maintained at 25° C. to form 2,4-dimethoxyphenylphosphine after neutralization. It should be understood that the above reaction is one possible method for obtaining 2,4-dimethoxyphenylphosphine and is exemplary only.

Step three of the method for forming 1,3,5,7-tetraalkyl-6-(2,4-dimethoxyphenyl)-2,4,8-trioxa-6-phosphaadamantane comprises, according to embodiments, reacting the 2,4-dimethoxyphenylphosphine with a mixture comprising to produce 1,3,5,7-tetraalkyl-6-(2,4-dimethoxyphenyl)-2,4,8-trioxa-6-phosphaadamantane. In one or more embodiments, the mixture is an acidic mixture that comprises diones. Various diones (diketones) are contemplated, such as, for example but not limited to, 2,4-pentanedione (acetylacetone), 1,5-trifluoromethyl-2,4-pentanedione, and 3,5-heptanedione. The mixture, in various embodiments, comprises three components: (1) an acid selected from the group consisting of Lewis acids, sulfonic Bronsted acids, and mixtures thereof; (2) aromatic hydrocarbons, non-aromatic hydrocarbons, and mixtures thereof; and (3) acetylacetone.

Traditional methods of forming 1,3,5,7-tetraalkyl-6-(2,4-dimethoxyphenyl)-2,4,8-trioxa-6-phosphaadamantane comprise using a mineral acid to convert a primary phosphine such as 2,4-dimethoxyphenylphosphine to 1,3,5,7-tetraalkyl-6-(2,4-dimethoxyphenyl)-2,4,8-trioxa-6-phosphaadamantane, and the product precipitates. However, the 1,3,5,7-tetraalkyl-6-(2,4-dimethoxyphenyl)-2,4,8-trioxa-6-phosphaadamantane ligand is electron rich and, therefore, a good base. Accordingly, 1,3,5,7-tetraalkyl-6-(2,4-dimethoxyphenyl)-2,4,8-trioxa-6-phosphaadamantane remains protonated and alkylated under certain conditions. After the traditional reaction is complete the 1,3,5,7-tetraalkyl-6-(2,4-dimethoxyphenyl)-2,4,8-trioxa-6-phosphaadamantane ligand is isolated by the neutralization of the acidic solution upon which it precipitates from the aqueous solution. In addition, the traditional method for converting 2,4-dimethoxyphenylphosphine to 1,3,5,7-tetraalkyl-6-(2,4-dimethoxyphenyl)-2,4,8-trioxa-6-phosphaadamantane comprises exotherms that occur upon neutralization and cause the reaction to heat rapidly to 100° C., which causes degradation of the 1,3,5,7-tetraalkyl-6-(2,4-dimethoxyphenyl)-2,4,8-trioxa-6-phosphaadamantane ligand, as well as causes other byproducts to be formed. The conversion of 2,4-dimethoxyphenylphosphine to 1,3,5,7-tetraalkyl-6-(2,4-dimethoxyphenyl)-2,4,8-trioxa-6-phosphaadamantane as conducted in accordance with embodiments of step 3 disclosed herein do not encounter such issues.

In various embodiments, the first component—the acid selected from the group consisting of Lewis acids, sulfonic Bronsted acids, and mixtures thereof—comprises at least one boron-containing Lewis acid, such as, for example $BF_3$, $BF_3(OEt_2)$, $BBr_3$, $BI_3$, and $BCl_3$. In one or more embodiments, the first component comprises methanesulfonic acid. In still other embodiments, the first component comprises Nafion® SAC-13 (a sulfonated tellaflouro-ethylene copolymer, or p-toluenesulfonic acid.

The second component—the aromatic hydrocarbons, non-aromatic hydrocarbons, and mixtures thereof—comprises, in various embodiments, ethereal hydrocarbon solvents, such as, for example, cyclopentyl methyl ether, di-tert-butyl ether, diethyl ether, diethylene glycol diethyl ether, diglyme, diphenyl ether, diisopropyl ether, dimethoxyethane, dimethoxymethane, 1,4-dioxane, ethyl tert-butyl ether, methoxyethane, 2-(2-methoxyethoxy)ethanol, methyl tert-butyl ether, 2-methyltetrahydrofuran, N-methyl morpholine, tetrahydrofuran, tetrahydropyran, and mixtures thereof. In other embodiments, the second component comprises benzene, methylcyclohexane, octane, cyclooctane, hexane, cyclohexane, toluene, heptane, and mixtures thereof. In still further embodiments, the second component may be selected from tetrahydrofuran, toluene, and mixtures thereof. According to one or more embodiments, the mixture comprises toluene as an aromatic hydrocarbon. According to other embodiments, the mixture comprises one or more non-aromatic hydrocarbons selected from the group consisting of hexane, cyclohexane, and heptane.

The second component in the third step may, in various embodiments, have the same composition as the ethereal solvent and/or the non-polar hydrocarbon solvent used in step 2 described above. However, in other embodiments, the second component in the third step may have a different composition than the ethereal solvent and/or the non-polar hydrocarbon solvent used in step 2 described above.

In embodiments, the first component, such as an acid, is present in the mixture in an amount from 2.50 eq to 4.00 eq, such as from 2.75 eq to 3.75 eq, from 3.00 eq to 3.50 eq, or about 3.25 eq, with respect to the 2,4-dimethoxyphenylphosphine. In one or more embodiments, the third component, such as acetylacetone, is present in the mixture in an amount from 1.00 eq to 3.00 eq, such as from 1.25 eq to 2.75 eq, from 1.50 eq to 2.50 eq, from 1.75 eq to 2.25 eq, or about 2.05 eq, with respect to the 2,4-dimethoxyphenylphosphine.

A temperature for reacting the components in step 3 and converting 2,4-dimethoxyphenylphosphine to 1,3,5,7-tetraalkyl-6-(2,4-dimethoxyphenyl)-2,4,8-trioxa-6-phosphaadamantane is, in various embodiments, from greater than −20° C. to 25° C., such as from −20° C. to 20° C., from −15° C. to 15° C., from −10° C. to 10° C., from −5° C. to 5° C., or about 0° C. In other embodiments, the temperature for reacting the components in step 3 and converting 2,4-dimethoxyphenylphosphine to 1,3,5,7-tetraalkyl-6-(2,4-dimethoxyphenyl)-2,4,8-trioxa-6-phosphaadamantane is from greater than 0° C. to 25° C., such as from 5° C. to 15° C., or about 10° C.

The duration for reacting the components in step 3 and converting 2,4-dimethoxyphenylphosphine to 1,3,5,7-tetraalkyl-6-(2,4-dimethoxyphenyl)-2,4,8-trioxa-6-phosphaadamantane is, in various embodiments, from 2 hours to 8 hours, such as from 3 hours to 7 hours, from 4 hours to 6 hours, or about 5 hours.

One exemplary reaction, according to some embodiments, for converting 2,4-dimethoxyphenylphosphine to 1,3,5,7-tetraalkyl-6-(2,4-dimethoxyphenyl)-2,4,8-trioxa-6-phosphaadamantane is as follows:

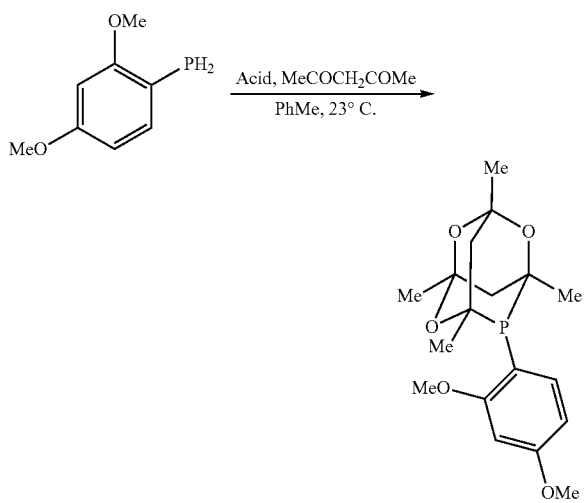

In this exemplary reaction a mixture acetylacetone, methanesulfonic acid, and toluene are mixed together to form a mixture at 23° C. To this mixture, 2,4-dimethoxyphenylphosphine was added and reacted with the mixture for 2.5 hours to form 1,3,5,7-tetraalkyl-6-(2,4-dimethoxyphenyl)-2,4,8-trioxa-6-phosphaadamantane.

Using embodiments of the 3-step method provided above, a high quality yield of 1,3,5,7-tetraalkyl-6-(2,4-dimethoxyphenyl)-2,4,8-trioxa-6-phosphaadamantane is produced without using costly, toxic, and flammable chemicals such as, for example, phosphine gas. These advantages make the methods for forming 1,3,5,7-tetraalkyl-6-(2,4-dimethoxyphenyl)-2,4,8-trioxa-6-phosphaadamantane disclosed herein advantageous compared to other methods for forming 1,3,5,7-tetraalkyl-6-(2,4-dimethoxyphenyl)-2,4,8-trioxa-6-phosphaadamantane in both cost and safety.

Yields of 1,3,5,7-tetraalkyl-6-(2,4-dimethoxyphenyl)-2,4,8-trioxa-6-phosphaadamantane using the methods according to embodiments disclosed and described herein are, in embodiments, 65% or greater based on the mass of the solids and purity of those solids obtained after the method is complete, such as 85% or greater, 90% or greater, or 95% or greater.

It should be understood that each of the above-described steps can be used individually or in any combination with one or more of the preceding or following steps according to embodiments. For instance, in embodiments, step two can be used with step one according to embodiments, or by replacing step one with another method for forming dichloro(2,4-dimethoxyphenyl)phosphine. Likewise, step two can be used with step three according to embodiments, or by replacing step three with other methods for forming 1,3,5,7-tetraalkyl-6-(2,4-dimethoxyphenyl)-2,4,8-trioxa-6-phosphaadamantane from 2,4-dimethoxyphenylphosphine. Similarly, step three can be used with one or more of step one and step two according to embodiments disclosed herein, or either of step one and step two may be replaced with other steps for forming their respective intermediate products.

EXAMPLES

Embodiments will be further clarified by the following examples.

Example 1

Example 1 tested various acids, temperatures, and durations for forming 1,3,5,7-tetramethyl-6-(2,4-dimethoxyphenyl)-2,4,8-trioxa-6-phosphaadamantane from 2,4-dimethoxyphenylphosphine. The type of acid, molarity of the acid, temperature, and duration are provided in Table 1 below. In the reaction, 2,4-dimethoxyphenylphosphine is converted to 1,3,5,7-tetramethyl-6-(2,4-dimethoxyphenyl)-2,4,8-trioxa-6-phosphaadamantane by reacting 2,4-dimethoxyphenylphosphine with a mixture of acetylacetone, an acid as outlined in Table 1, and toluene at the temperature and duration shown in Table 1. The molar concentration and the yield of 1,3,5,7-tetramethyl-6-(2,4-dimethoxyphenyl)-2,4,8-trioxa-6-phosphaadamantane are also provided in Table 1. The above reaction was conducted under a nitrogen atmosphere.

TABLE 1

| Trial | Add (eq) | Concentration | Temp. | Time | Crude Yield (% Purity of Crude Product) |
|---|---|---|---|---|---|
| 1 | MeSO$_3$H (32.6 eq) | 0.18M | 25° C. | 48 hrs | Complex Mixture |
| 2 | MeSO$_3$H (16.0 eq) | 0.18M | 25° C. | 48 hrs | 45% (64% pure) |
| 3 | MeSO$_3$H (8.00 eq) | 0.18M | 25° C. | 48 hrs | 60% (93% pure) |
| 4 | MeSO$_3$H (4.00 eq) | 0.18M | 25° C. | 48 hrs | 50% (98% pure) |
| 5 | MeSO$_3$H (4.00 eq) | 0.18M | 25° C. | 24 hrs | 89% (90% pure) |
| 6 | MeSO$_3$H (3.00 eq) | 0.18M | 25° C. | 24 hrs | 90% (93% pure) |
| 7 | MeSO$_3$H (2.00 eq) | 0.18M | 25° C. | 24 hrs | 89% (89% pure) |
| 8 | MeSO$_3$H (2.50 eq) | 0.37M | 25° C. | 15 hrs | 52% (89% pure) |
| 9 | MeSO$_3$H (2.50 eq) | 0.74M | 25° C. | 15 hrs | 51% (85% pure) |
| 10 | MeSO$_3$H (2.50 eq) | 1.47M | 25° C. | 15 hrs | 52% (91% pure) |
| 11 | MeSO$_3$H (2.50 eq) | 1.47M | 25° C. | 6 hrs | 74% (88% pure) |
| 12 | H$_2$SO$_4$ (2.50 eq) | 1.47M | 25° C. | 6 hrs | 33% (68% pure) |
| 13 | MeSO$_3$H (2.50 eq) | 1.47M | 40° C. | 6 hrs | 56% (81% pure) |
| 14 | MeSO$_3$H (2.50 eq) | 1.47M | 60° C. | 6 hrs | 56% (91% pure) |
| 15 | MeSO$_3$H (2.50 eq) | 1.47M | 25° C. | 2 hrs | 47% (90% pure) |
| 16 | MeSO$_3$H (2.50 eq) | 1.47M | 25° C. | 3 hrs | 44% (87% pure) |
| 17 | MeSO$_3$H (2.50 eq) | 1.47M | 25° C. | 2 hrs | 33% (75% pure) |
| 18 | MeSO$_3$H (2.50 eq) | 1.47M | 25° C. | 2 hrs | 31% (67% pure) |
| 19 | MeSO$_3$H (2.50 eq) | 1.47M | 25° C. | 2 hrs | 38% (66% pure) |
| 20 | MeSO$_3$H (2.50 eq) | 1.47M | 25° C. | 2 hrs | 34% (80% pure) |
| 21 | MeSO$_3$H (2.50 eq) | 1.83M | 25° C. | 2 hrs | 65% (84% pure) |

As shown in Table 1, methanesulfonic acid at between 2.00 eq and 4.00 eq, based on the arylphosphine, and between 0.18 molar and 1.47 molar provided the best yields in the lowest reaction durations. Table 1 also shows that sulfuric acid, if added in the right concentration and amount can yield product, as is shown in Trial 12. Accordingly, methanesulfonic acid and sulfuric acid used within these ranges was shown to provide reaction yields much higher than the yields achieved when using conventional mineral acids, such as, for example HCl. In addition, the duration of the reaction is much less than conventional reactions performed using mineral acids, such as, for example, HCl, which can take days.

Example 2

Example 2 tested various acids for forming 1,3,5,7-tetramethyl-6-(2,4-dimethoxyphenyl)-2,4,8-trioxa-6-phosphaadamantane from 2,4-dimethoxyphenylphosphine. The type of acid is provided in Table 2 below. In the reaction, 2,4-dimethoxyphenylphosphine is converted to 1,3,5,7-tetramethyl-6-(2,4-dimethoxyphenyl)-2,4,8-trioxa-6-phosphaadamantane by reacting 2,4-dimethoxyphenylphosphine with a mixture of acetylacetone, an acid as outlined in Table 2, and toluene at 23° C. for 2.5 hours. The conversion of primary phosphine, acid used in the reaction, and the product yield are also provided in Table 2.

The reaction of Example 2 is as follows:

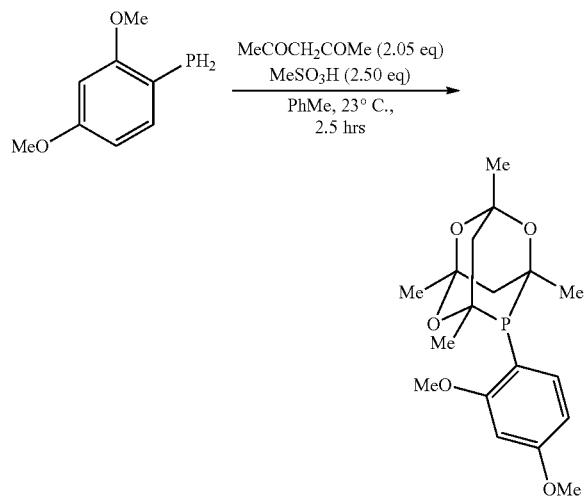

TABLE 2

Evaluation of Various Bronsted and Lewis Acids for Step 3.

| Trial | Acid (eq) | Conversion | Crude Yield of Product |
|---|---|---|---|
| 1 | $F_3CCO_2H$ | 88% | 1% |
| 2 | AcOH | 0% | 0% |
| 3 | PPTS | 0% | 0% |
| 4 | PTSA-$H_2O$ | 100% | 83% |
| 5 | Nafion® SAC 13 | 3% | 3% |
| 6 | DOWEX HCR-S/S | 0% | 0% |
| 7 | 1.25M HCl in EtOH | complex mixture | 0% |
| 8 | $BF_3 \cdot OEt_2$ | 100% | 47% |
| 9 | $TiCl_4$ | 100% | 0% |
| 10 | $InBr_3$ | 100% | 0% |

In Table 2 above, DOWEX HCR-S/S is a polystyrene-based polysulfonic acid that is available from Sigma-Aldrich. As shown in Table 2, toluenesulfonic acid and a boron-containing Lewis acid provided the best yields. Nafion® SAC-13 also yielded the product.

Example 3

Example 3 provides a detailed reaction for an embodiment for converting dimethoxybenzene to dichloro(2,4-dimethoxyphenyl)phosphine as disclosed herein using the following reaction:

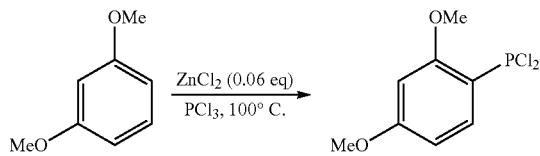

In a glovebox, a 100 mL round bottom flask was charged with 1,3-dimethoxybenzene (10.4 mL, 79.4 mmol, 1.00 equiv), $PCl_3$ (34.6 mL, 397 mmol, 5.00 equiv), and $ZnCl_2$ (0.649 g, 4.77 mmol, 6.00 mol %). The flask was connected to a coiled condenser and heated to 100° C. After 15 hours, an aliquot was removed for NMR analysis. Near-complete conversion was observed, and the reaction was cooled to ambient temperature. 6 grams of celite was added, and the excess $PCl_3$ was removed with a vacuum pump at 45° C. A chalky-white, heterogeneous mixture was left behind. 30 mL of cyclohexane was added, and the mixture was allowed to stir for 30 minutes. Although some solids coated the flask walls, the majority were free-flowing. The slurry was filtered through a plug of neutral alumina, and the plug was rinsed with additional portions of cyclohexane. The filtrate was concentrated under vacuum to give 14.947 g of a clear, colorless oil. Proton/Phosphorus NMR showed product with small amounts of 1,3-dimethoxybenzene and di-substituted product, but no $PCl_3$ or solvent. Purity is 93.8%, 74% isolated yield.

$^1$H NMR (500 MHz, Chloroform-d) δ 7.35 (t, J=7.9 Hz, 1H), 6.43 (d, J=7.7 Hz, 3H), 3.83 (s, 3H), 3.79 (s, 3H), 2.30 (d, J=45.5 Hz, 1H).

$^{31}$P NMR (202 MHz, Chloroform-d) δ −143.65.

Example 4

Example 4 provides a protocol of an embodiment of step two for converting dichloro(2,4-dimethoxyphenyl)phosphine to 2,4-dimethoxyphenylphosphine using the following reaction:

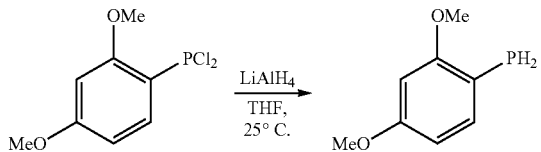

In a glovebox, a 200 mL jar was charged with lithium aluminum hydride (2M in THF, 11.0 mL, 22.1 mmol, 0.60 equiv). To the jar, 70 mL dry toluene was added, followed by dichlorophosphine (10.89 g of a 80.8% pure batch, 36.8 mmol, 1.00 equiv) in 10 mL toluene. The dichlorophosphine was added slowly over 30 minutes. The mixture was stirred at 25° C. for 2 hours, and was quenched by the Fieser protocol as follows: slow addition of 0.835 mL water, followed by 0.835 mL 15% aq. NaOH, followed by 2.50 mL water. 1 hour after the final addition of water, 7 g of anhydrous sodium sulfate was added. The mixture was stirred overnight.

The slurry was filtered through a plug of neutral alumina. The flask and solids were rinsed with two additional portions of toluene. The filtrate was concentrated to give 5.7828 g of a colorless oil. Proton/Phosphorus NMR showed fairly pure product with some 1,3-dimethoxybenzene and leftover solvent. The results were 83.9% product by mass, giving a 78% yield.

$^1$H NMR (500 MHz, Chloroform-d) δ 7.35 (t, J=7.9 Hz, 1H), 6.43 (d, J=7.7 Hz, 3H), 3.83 (s, 3H), 3.79 (s, 3H), 2.30 (d, J=45.5 Hz, 1H).

$^{31}$P NMR (202 MHz, Chloroform-d) δ −143.65.

Comparative Example 1

This comparative example was prepared in the same manner as Example 5, except that the lithium aluminum hydride was added to the solution comprising dichloroarylphosphine. When the order of reagent addition was reversed (Lithium aluminum hydride is added to a solution of the dichloroarylphosphine), undesired products were formed, especially when the reaction solvent is very polar. The cyclic phospholane shown below was the major product isolated from a reaction that reversed the order of addition. This comparative example was performed as follows.

In a glovebox, three 50 mL jars were each charged with dichlorophosphine (87.7% pure by mass, 1.48 g, 5.44 mmol, 1.00 equiv) and 12.5 mL of dry degassed solvent comprising THF, cyclohexane, and xylene. At room temperature, a lithium aluminum hydride solution (2M in THF, 2.50 mL, 5.00 mmol, 0.9174 equiv) was added over a duration of about 5 minutes. Vigorous effervescence was observed. The mixtures were stirred for about 2 hours before Fieser workup, which included an addition of 0.19 mL water, an addition of 0.19 mL 15% aq. NaOH, and an addition of 0.57 mL water. Each mixture was allowed to stir overnight under nitrogen to precipitate alumina. Each reaction was then filtered and volatiles of the filtrates removed in vacuuo.

Phosphorus NMRs revealed the following product distribution: A) 80:20 cyclic phospholane product, 1:99 cyclic phospholane product, and 27:73 cyclic phospholane product. The above reaction is shown in the reaction synthesis below. The results are shown in Table 3.

TABLE 3

| Trial | Order of Addition | Solvent | $LiAlH_4$ Eq. | Yield |
|---|---|---|---|---|
| 1 | 3 added to $LiAlH_4$ | THF | 0.92 | 86% (<5% 5) |
| 2 | $LiAlH_4$ added to 3 | THF | 0.92 | <5% (>80% 88:12 mix of 5 & 6) |
| 3 | $LiAlH_4$ added to 3 | cyclohexane | 0.92 | 65% (<5% 5) |
| 4 | 3 added to $LiAlH_4$ | cyclohexane | 0.92 | 80% |
| 5 | 3 added to $LiAlH_4$ | cyclohexane | 0.70 | 88% |
| 6 | 3 added to $LiAlH_4$ | cyclohexane | 0.55 | 72% |
| 7 | 3 added to $LiAlH_4$ | toluene | 0.60 | 78% (9 g scale) |
| 8 | 3 added to $LiAlH_4$ | toluene | 0.60 | 80% |
| 9 | 3 added to $LiAlH_4$ | toluene | 0.60 | 85% (9 g scale) |
| 10 | 3 added to $LiAlH_4$ | heptane | 0.60 | 65% |

Example 6

Example 6 provides a first protocol of an embodiment of step three for converting 2,4-dimethoxyphenylphosphine to 1,3,5,7-tetramethyl-6-(2,4-dimethoxyphenyl)-2,4,8-trioxa-6-phosphaadamantane using the following reaction:

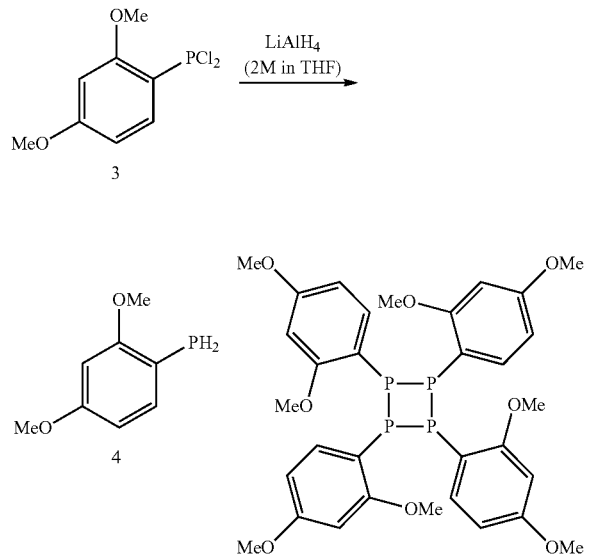

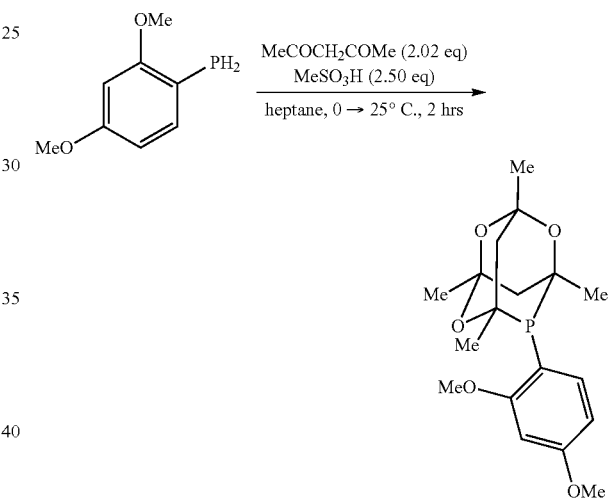

A clear pale yellow solution of acetylacetone (1.08 mL 10.5 mmol, 2.02 eq) and 2,4-dimethoxyphenylphosphine (90.5% pure, 5.13 mmol, 1.00 eq) in anhydrous de-oxygenated toluene (2.80 mL) was formulated in a nitrogen filled glovebox at 25° C. $MeSO_3H$ (0.832 mL, 12.8 mmol, 2.50 eq) was added in a slow, dropwise manner over the course of 2 minutes. After stirring vigorously (1000 rpm) for 2.5 hrs at 25° C., the slightly biphasic golden yellow solution was removed from the glovebox, placed in an ice water bath, stirred vigorously (1000 rpm) for 10 minutes, and slowly neutralized with an aqueous NaOH solution (16 mL, 10%) via a slow, dropwise addition over 5 minutes. The resulting pale yellow heterogeneous mixture was removed from the ice water bath, diluted with toluene (5 mL), stirred vigorously at 23° C. for 5 minutes, and suction filtered through a pad of celite. The solid was rinsed with aqueous NaOH (2×10 mL, 10%) and then toluene (3×10 mL). The biphasic filtrate was poured into a separatory funnel, partitioned, organics were washed with an aqueous NaOH solution (3×10 mL, 10%). Residual organics were extracted from the aqueous layer using toluene (1×10 mL), combined, dried over solid $Na_2SO_4$, suction filtered through a pad of celite and $Na_2SO_4$, and concentrated to afford 1.66 g of the crude phosphine product. Proton NMR of the pale amber oil showed a mixture of product, 1,3-dimethoxybenzene, and toluene as the three major components. The material was about 70.3% by mass, corresponding to a 65% yield.

The material was recrystallized from ethanol. The solid was dried in a vacuum oven. Proton/Phosphorus NMR showed that the solid was consistent with product. Then, 0.739 g was isolated, and the isolated yield was 41%.

$^{1}$H NMR (500 MHz, Chloroform-d) δ 7.99 (dd, J=8.5, 2.6 Hz, 1H), 6.52 (dd, J=8.6, 2.3 Hz, 1H), 6.44 (dd, J=4.4, 2.4 Hz, 1H), 3.82 (s, 6H), 2.09 (dd, J=13.1, 7.4 Hz, 1H), 1.91 (dd, J=25.7, 13.2 Hz, 1H), 1.85 (dd, J=13.3, 1.0 Hz, 1H), 1.47 (d, J=12.2 Hz, 3H), 1.46-1.42 (m, 1H), 1.40 (s, 3H), 1.39 (s, 3H), 1.26 (d, J=12.0 Hz, 3H).

$^{31}$P NMR (202 MHz, Chloroform-d) δ −43.45.

$^{13}$C NMR (126 MHz, Chloroform-d) δ 164.61 (d, J=18.1 Hz), 162.10, 134.90 (d, J=3.7 Hz), 112.98 (d, J=25.7 Hz), 105.28, 98.17 (d, J=2.6 Hz), 96.39 (d, J=83.9 Hz), 73.70 (d, J=8.9 Hz), 73.11 (d, J=22.0 Hz), 55.44, 55.27, 46.00 (d, J=19.1 Hz), 36.54 (d, J=2.3 Hz), 28.07, 27.84, 27.73 (d, J=20.2 Hz), 26.66 (d, J=11.4 Hz).

HRMS (ESI): calculated $C_{18}H_{25}O_{5}P$ [M+H]$^{+}$ as 353.1513; found 353.1547.

Example 7

Example 7 provides a second protocol of an embodiment of step three for converting 2,4-dimethoxyphenylphosphine to 1,3,5,7-tetramethyl-6-(2,4-dimethoxyphenyl)-2,4,8-trioxa-6-phosphaadamantane using the following reaction:

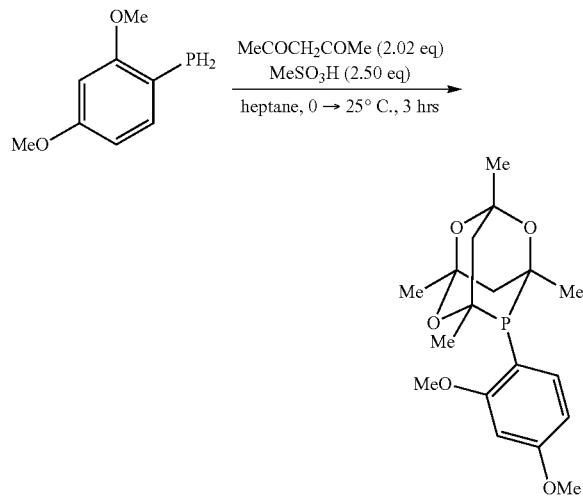

Acetylacetone (0.547 g, 5.47 mmol) and methanesulfonic acid (0.632 g, 6.57 mmol) were dissolved in 0.5 mL heptane and transferred to a 25 mL Schlenk flask. Separately, the primary phosphine (0.422 g, 2.48 mmol) was dissolved in 0.5 mL heptane. The acetylacetone solution was cooled to 0° C. in an ice water bath, and the primary phosphine was added to the solution dropwise over a period of 2 minutes. The reaction was allowed to warm to room temperature with vigorous stirring and was reacted for an additional 3 hours. After this time, the now biphasic reaction mixture was cooled again to 0° C., and 5M NaOH was added until the pH was in the range of 10 to 11. As this addition occurred, a white solid precipitated from the mixture. Additional water was added (2 mL), and the white solid was isolated via filtration and washed with water. The solid was dried in vacuo to yield 1,3,5,7-tetramethyl-6-(2,4-dimethoxyphenyl)-2,4,8-trioxa-6-phosphaadamantane (0.682 g, 78%).

$^{1}$H NMR (500 MHz, Chloroform-d) δ 7.99 (dd, J=8.5, 2.6 Hz, 1H), 6.52 (dd, J=8.6, 2.3 Hz, 1H), 6.44 (dd, J=4.4, 2.4 Hz, 1H), 3.82 (s, 6H), 2.09 (dd, J=13.1, 7.4 Hz, 1H), 1.91 (dd, J=25.7, 13.2 Hz, 1H), 1.85 (dd, J=13.3, 1.0 Hz, 1H), 1.47 (d, J=12.2 Hz, 3H), 1.46-1.42 (m, 1H), 1.40 (s, 3H), 1.39 (s, 3H), 1.26 (d, J=12.0 Hz, 3H).

$^{31}$P NMR (202 MHz, Chloroform-d) δ −43.45.

$^{13}$C NMR (126 MHz, Chloroform-d) δ 164.61 (d, J=18.1 Hz), 162.10, 134.90 (d, J=3.7 Hz), 112.98 (d, J=25.7 Hz), 105.28, 98.17 (d, J=2.6 Hz), 96.39 (d, J=83.9 Hz), 73.70 (d, J=8.9 Hz), 73.11 (d, J=22.0 Hz), 55.44, 55.27, 46.00 (d, J=19.1 Hz), 36.54 (d, J=2.3 Hz), 28.07, 27.84, 27.73 (d, J=20.2 Hz), 26.66 (d, J=11.4 Hz).

HRMS (ESI): calculated $C_{18}H_{25}O_{5}P$ [M+H]$^{+}$ as 353.1513; found 353.1547.

The $^{1}$H and $^{31}$P NMR spectra showed that the solid was consistent with the spectra of previous 1,3,5,7-tetramethyl-6-(2,4-dimethoxyphenyl)-2,4,8-trioxa-6-phosphaadamantane samples. The sample itself is ever so slightly yellow, but it can be recrystallized to yield a more colorless product.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method for forming 1,3,5,7-tetraalkyl-6-(2,4-dimethoxyphenyl)-2,4,8-trioxa-6-phosphaadamantane, comprising:
    obtaining a solution comprising an ethereal solvent and an aluminum hydride;
    adding dichloro(2,4-dimethoxyphenyl)phosphine to the solution to produce 2,4-dimethoxyphenylphosphine, wherein the solution has a temperature from greater than −20° C. to 50° C. throughout the method; and
    reacting the 2,4-dimethoxyphenylphosphine with an acidic mixture comprising diones to produce 1,3,5,7-tetraalkyl-6-(2,4-dimethoxyphenyl)-2,4,8-trioxa-6-phosphaadamantanes.

2. The method according to claim 1, wherein the dichloro(2,4-dimethoxyphenyl)phosphine is mixed with a non-polar hydrocarbon solvent before the dichloro(2,4-dimethoxyphenyl)phosphine is added to the solution of aluminum hydride.

3. The method according to claim 2, wherein the non-polar hydrocarbon solvent is selected from the group consisting of hexane, cyclohexane, toluene, heptane, and mixtures thereof.

4. The method according to claim 1, wherein the ethereal solvent is tetrahydrofuran (THF).

5. The method according to claim 1, wherein the solution has a temperature from 0° C. to 25° C.

6. A method for forming 1,3,5,7-tetraalkyl-6-(2,4-dimethoxyphenyl)-2,4,8-trioxa-6-phosphaadamantane, comprising:
    obtaining dichloro(2,4-dimethoxyphenyl)phosphine;
    forming 2,4-dimethoxyphenylphosphine by adding the dichloro(2,4-dimethoxyphenyl)phosphine to a solution comprising at least one solvent and an aluminum hydride;
    reacting the 2,4-dimethoxyphenylphosphine with a mixture to produce 1,3,5,7-tetraalkyl-6-(2,4-dimethoxyphenyl)-2,4, 8-trioxa-6-phosphaadamantane, wherein the mixture comprises:
an acid selected from the group consisting of Lewis acids, Bronsted acids, and mixtures thereof;
an aromatic or non-aromatic hydrocarbons; and
acetylacetone.

7. The method according to claim 6, wherein the acid comprises at least one of a boron-containing Lewis acid and a sulfonic acid.

8. The method according to claim 7, wherein the boron-containing Lewis acid is $BF_3$-$OEt_2$ and the sulfonic acid is methanesulfonic acid or p-toluenesulfonic acid.

9. The method according to claim 6, wherein the mixture comprises from 2.5 to 4.0 equivalents of the acid.

10. The method according to claim 6, wherein the mixture comprises toluene as an aromatic hydrocarbon.

11. The method according to claim 6, wherein the mixture comprises one or more non-aromatic hydrocarbons selected from the group consisting of hexane, cyclohexane, and heptane.

12. The method according to claim 6, wherein a temperature for reacting the 2,4-dimethoxyphenylphosphine with a mixture to form 1,3,5,7-tetraalkyl-6-(2,4-dimethoxyphenyl)-2,4,8-trioxa-6-phosphaadamantane is from greater than −20° C. to 25° C.

13. The method according to claim 1, wherein the aluminum hydride is lithium aluminum hydride.

14. The method of claim 1, wherein a yield of 1,3,5,7-tetraalkyl-6-(2,4-dimethoxyphenyl)-2,4,8-trioxa-6-phosphaadamantane is 65% or greater.

15. The method according to claim 1, wherein the reacting the 2,4-dimethoxyphenylphosphine to produce 1,3,5,7-tetraalkyl-6-(2,4-dimethoxyphenyl)-2,4,8-trioxa-6-phosphaadamantane has a duration from 2 hours to 8 hours.

16. The method according to claim 6, wherein the aluminum hydride is lithium aluminum hydride.

17. The method of claim 6, wherein a yield of 1,3,5,7-tetraalkyl-6-(2,4-dimethoxyphenyl)-2,4,8-trioxa-6-phosphaadamantane is 65% or greater.

18. The method according to claim 6, wherein the reacting the 2,4-dimethoxyphenylphosphine to produce 1,3,5,7-tetraalkyl-6-(2,4-dimethoxyphenyl)-2,4,8-trioxa-6-phosphaadamantane has a duration from 2 hours to 8 hours.

* * * * *